United States Patent
Naumann et al.

(10) Patent No.: US 7,041,612 B2
(45) Date of Patent: May 9, 2006

(54) LEAD-FREE AND ARSENIC-FREE SPECIAL SHORT FLINT GLASS

(75) Inventors: Karin Naumann, Ober-Olm (DE); Uwe Kolberg, Mainz-Kastel (DE); Frank-Thomas Lentes, Bingen (DE)

(73) Assignee: Schott Glas, Mainz (DE)

( * ) Notice: Subject to any disclaimer, the term of this patent is extended or adjusted under 35 U.S.C. 154(b) by 283 days.

(21) Appl. No.: 10/456,323

(22) Filed: Jun. 6, 2003

(65) Prior Publication Data

US 2004/0033880 A1    Feb. 19, 2004

(30) Foreign Application Priority Data

Jun. 6, 2002    (DE) ................ 102 25 366

(51) Int. Cl.
*C03C 3/97*    (2006.01)
*C03C 3/87*    (2006.01)
*C03C 4/00*    (2006.01)

(52) U.S. Cl. ............... 501/63; 501/70; 501/72
(58) Field of Classification Search ......... 501/63, 501/70, 72, 903
See application file for complete search history.

(56) References Cited

U.S. PATENT DOCUMENTS

| | | | |
|---|---|---|---|
| 4,084,978 A | | 4/1978 | Sagara |
| 4,526,874 A | * | 7/1985 | Grabowski geb. Marszalek et al. ............ 501/77 |
| 5,320,985 A | | 6/1994 | Enomoto |
| 6,709,998 B1 | * | 3/2004 | Wolff et al. ............ 501/73 |

FOREIGN PATENT DOCUMENTS

| | | |
|---|---|---|
| DE | 31 23 220 A1 | 3/1982 |
| DE | 44 43 173 C2 | 4/1997 |
| EP | 0 287 345 | 4/1988 |
| JP | 52 25812 | 8/1975 |
| JP | 58-46459 | 10/1983 |
| JP | 1133 956 A | 5/1989 |
| JP | 08048538 A | 2/1996 |

* cited by examiner

*Primary Examiner*—Karl Group
*Assistant Examiner*—Elizabeth A. Bolden

(57) ABSTRACT

The invention describes a lead-free and arsenic-free special short flint glass with a refractive index $1.60 \leq n_d \leq 1.65$, an Abbe number of $41 \leq v_d \leq 52$, a relative partial dispersion $0.551 \leq P_{gF} \leq 0.570$ in the blue spectral region, a relative partial dispersion $0.507 \leq P_{Cs} \leq 0.525$ in the red spectral region, a negative deviation of the relative partial dispersion from the normal line $\Delta P_{g,F} \leq -0.0045$ and an improved chemical resistance which has the following composition (in % by weight):

| | |
|---|---|
| $SiO_2$ | >50–65 |
| $Al_2O_3$ | 0–7 |
| $B_2O_3$ | 0–6 |
| $Li_2O$ | 0–6 |
| $Na_2O$ | 3–11 |
| $K_2O$ | 0–6 |
| MgO | 0–12 |
| CaO | 1–12 |
| BaO | 0–8 |
| $La_2O_3$ | 0–15 |
| $Ta_2O_5$ | 0–10 |
| $Nb_2O_5$ | 4–20 |
| $ZrO_2$ | >10–20 |
| $\Sigma(CaO + MgO + BaO)$ | 1–25 |
| $\Sigma(Na_2O + K_2O + Li_2O)$ | 3–20 |
| $SiO_2/(ZrO_2 + La_2O_3 + Nb_2O_5 + Ta_2O_5)$ | 1.5–2.3. |

6 Claims, No Drawings

LEAD-FREE AND ARSENIC-FREE SPECIAL SHORT FLINT GLASS

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates to a lead-free and arsenic-free special short flint glass.

TECHNICAL FIELD

Previous developments in the field of lead-free special short flint glasses have been based on the borate or borosilicate glass systems (the latter with small quantities of $SiO_2$, while the main constituent remains $B_2O_3$). However, these borate or borosilicate glasses have the drawback of having only a poor chemical resistance and, furthermore, there are considerable problems with processing these glasses to form high-performance and precision optics. Moreover, the production costs are generally very high on account of the high $Ta_2O_5$ contents, which are present in these glasses.

DE 44 43 173 C2 has given a dental glass, which can be classified as belonging to the $SiO_2$—$ZrO_2$—$R_2O$ glasses. This glass contains, inter alia, CaO and $Nb_2O_5$ as optional components. This glass, which according to the exemplary embodiment has a refractive index $n_d<1.60$, is opaque and is generally used as glass powder for dental applications. According to this document, the $SiO_2/(ZrO_2+La_2O_3+Ta_2O_5)$ ratio, which describes the chemical conditions within the glass, is 2.6–14.0.

EP 6 453 49 has disclosed an optical glass which as compulsory components includes $SiO_2$ and $Nb_2O_5$ and also includes a relatively large number of optional components.

The refractive index of glasses of this type is supposed to be between 1.52 and 1.67. This low refractive index is to be based, inter alia, on the fact that there is only a limited amount of $ZrO_2$. Furthermore, this EP document claims fluorine. However, a high fluorine content tends to lead to an increase in the partial dispersion $\Delta P_{g,F}$ even up to positive values.

SUMMARY OF THE INVENTION

It is an object of the present invention to provide a lead-free and arsenic-free glass which, on account of its optical position, can be classified as belonging to the special short flint glasses and which, furthermore, is also chemically stable and can be machined successfully and accurately, for example during the production of optical components. In particular, it is also to be possible to produce the novel glass at low cost.

This object is achieved by a lead-free and arsenic-free special short flint glass having all of the following features:

A lead-free and arsenic-free special short flint glass with a refractive index $1.60 \leq n_d \leq 1.65$, an Abbe number of $41 \leq v_d \leq 52$, a relative partial dispersion $0.551 \leq P_{g,F} \leq 0.570$ in the blue spectral region, a relative partial dispersion $0.507 \leq P_{C,s} \leq 0.525$ in the red spectral region, a negative deviation of the relative partial dispersion from the normal line $\Delta P_{g,F} \leq -0.0045$ and an improved chemical resistance which has the following composition (in % by weight):

| | |
|---|---|
| $SiO_2$ | >50–65 |
| $Al_2O_3$ | 0–7 |
| $B_2O_3$ | 0–6 |
| $Li_2O$ | 0–6 |
| $Na_2O$ | 3–11 |
| $K_2O$ | 0–6 |
| MgO | 0–12 |
| CaO | 1–12 |
| BaO | 0–8 |
| $La_2O_3$ | 0–15 |
| $Ta_2O_5$ | 0–10 |
| $Nb_2O_5$ | 4–20 |
| $ZrO_2$ | >10–20 |
| $\Sigma(CaO + MgO + BaO)$ | 1–25 |
| $\Sigma(Na_2O + K_2O + Li_2O)$ | 3–20 |
| $SiO_2/(ZrO_2 + La_2O_3 + Nb_2O_5 + Ta_2O_5)$ | 1.5–2.3 |

A preferred production process is to produce this lead-free and arsenic-free special short fling glass in a cooled crucible using a high-frequency method.

DETAILED DESCRIPTION OF THE INVENTION

The glasses according to the invention can be classified as belonging to the zirconium silicate glasses. They have the required optical position as special short flint glasses and furthermore are extremely chemically stable/resistant, in particular compared to the abovementioned borate glasses.

This has the advantage that during the polishing process any desired liquid can be used as carrier for the polishing abrasive, whereas with borate glasses the use of aqueous carrier liquids must often be ruled out. A further advantage of the very good chemical resistance is that the glasses according to the invention can also be used as a front lens in multilens optical systems. This widens the range of possible uses for the glasses according to the invention. Therefore, they can also be used in a corrosive environment.

Furthermore, on account of the high Knoop hardness of >600, the glasses according to the invention are distinguished by better machineability than the borate glasses or borosilicate glasses. This enables the manufacturers of optical instruments to run the grinding and polishing machines at a high rate of advance, leading to low production costs. Also, the lower $B_2O_3$ and $Ta_2O_5$ contents compared to the borate or borosilicate glasses means that the raw material costs are significantly lower, i.e. the glasses according to the invention can be produced at low cost.

The glasses according to the invention have a refractive index of $1.60 \leq n_d \leq 1.65$, an Abbe number of $41 \leq v_d \leq 52$, a relative partial dispersion $0.551 \leq P_{g,F} \leq 0.570$ in the blue spectral region, a relative partial dispersion $0.507 \leq P_{C,s} \leq 0.525$ in the red spectral region and a negative deviation of the relative partial dispersion from the normal line $\Delta P_{g,F} \leq -0.0045$.

By suitably combining optical glasses with different Abbe numbers, it is generally only possible to eliminate or at least reduce the chromatic aberration in lens systems for only two colors.

The residual chromatic aberration (color deviation) which remains for the uncorrected colors is referred to as the secondary spectrum. This effect is highly disadvantageous in particular for high-performance optics, since the depth of focus and the resolution of the optics are adversely affected. The use of the glasses according to the invention with relative partial dispersions which are matched to one another in various spectral regions allows the chromatic aberration to be corrected or at least greatly reduced for further wavelengths as well. In this way, it is possible to construct optical systems with a virtually diffraction-limited resolution in a broad spectral range. Special short flint glasses are generally used in multilens systems which have been corrected within a broad spectral band, the short flint element generally having a negative refractive power. For example, if a triplet (three-element lens system) is to be chromatically corrected for three wavelengths, the glasses should cover the largest possible triangular area in a diagram in which the relative partial dispersion in the blue spectral region (e.g. $P_{gF}$) is illustrated as a function of the Abbe number. If the triplet is to be chromatically corrected for four wavelengths, it is necessary for the three glasses used additionally to comply with the following condition: the glasses used must lie on a straight line in a diagram in which the relative partial dispersion in the red spectral region (e.g. $P_{CS}$) is illustrated as a function of the relative partial dispersion in the blue spectral region (e.g. $P_{gF}$). These properties mean that the glasses according to the invention are particularly suitable for use as corrective glasses.

The glasses according to the invention have $SiO_2$ contents of >50–65% by weight, preferably >50–60% by weight, and a $ZrO_2$ content of >10–20% by weight, preferably 14–20% by weight.

The $SiO_2$ content helps to achieve the desired low Abbe number. At $SiO_2$ contents of ≦50% by weight, the risk of segregation and crystallization increases. $SiO_2$ contents of >65% by weight adversely affect the melting properties, possibly even making the glasses impossible to melt. Moreover, with high $SiO_2$ contents, it is difficult to achieve sufficiently high refractive indices. Excessively high levels of $ZrO_2$ make melting more difficult and unmelted particles may remain. The glasses lack homogeneity and are not suitable as optical glasses. $ZrO_2$ contents which are too low adversely affect the chemical resistance, lead to a low refractive index and also lead to a low negative deviation of the relative partial dispersion. The oxides $SiO_2$ and $ZrO_2$ in combination are responsible for the very good chemical properties. This can be ascribed to the fact that they are able to consolidate the glass network. Moreover, both oxides have a good resistance to acids and alkalis. To improve the melting properties, alkali metal oxides are added in the form of 3–11% by weight of $Na_2O$, 0.6% by weight of $K_2O$ and 0–6% by weight of $Li_2O$. Alkali metal oxides increase the solubility of the $ZrO_2$ in the silicate glass. The composition ranges are preferably 4–11% by weight of $Na_2O$, 0–6% by weight of $Li_2O$ and 0–6% by weight of $K_2O$, and even more preferably are 5–11% by weight of $Na_2O$, 0–4% by weight of $Li_2O$ and 0–6% by weight of $K_2O$. If the $R_2O$ content (=Σ $Na_2O+K_2O+Li_2O$) rises to >20% by weight, the glasses begin to crystallize. On the other hand, if the $R_2O$ content drops to <3% by weight, the $ZrO_2$ is no longer soluble and the glasses can no longer be melted. Moreover, the production process described in claim 6 requires a certain electrical conductivity, which is on the one hand provided by $ZrO_2$ and is also assisted by the conductive alkali metal ions, preferably $Li_2O$ and $Na_2O$. MgO, CaO and BaO increase the glass formation range and improve the melting properties of the glass by reducing the melt viscosity, which is an important property with regard to the homogeneity of the optical glasses. In particular BaO reduces the tendency to crystallize.

According to the invention, the CaO, MgO and BaO contents are 1–12% by weight, 0–12% by weight and 0–8% by weight. The contents are preferably 1–8% by weight, 0–8% by weight and 0–8% by weight, or 1–8% by weight of CaO, 0.8% by weight of MgO and 0.2–8% by weight of BaO.

According to the invention the sum Σ CaO, MgO and BaO is 1–25% by weight, preferably 1–24% by weight. If the sum is increased, the Abbe number rises and so does the likelihood of crystallization within the claimed range.

$Nb_2O_5$ contributes to a desirably low (negative deviation from the normal line!) anomalous partial dispersion. Moreover, this component has a positive effect on a low Abbe number.

According to the invention, the $Nb_2O_5$ content is 4–20% by weight, preferably 6–20% by weight. Higher $Nb_2O_5$ contents lead to increased crystallization and make melting more difficult. Moreover, the batch costs increase. Lower $Nb_2O_5$ contents lead to the anomalous negative partial dispersion, in particular in combination with a low Abbe number, no longer being achieved.

Furthermore, the glasses may contain up to 15% by weight of $La_2O_3$. $La_2O_3$ increases the Abbe number. However, if the $La_2O_3$ content is increased to above 15% by weight, the Abbe number rises above the required level and moreover the risk of crystallization also increases. The glasses may contain up to 10% by weight, preferably between 2 and 10% by weight, of $Ta_2O_5$, thus promoting the low anomalous partial dispersion. Moreover, $Ta_2O_5$ increases the refractive index, as do the other optional components. Since the raw material is very expensive, it will not generally be advisable to use more than 10% by weight, even though this is technically possible, on account of the high costs.

$B_2O_3$ is optional and improves the melting properties by reducing the viscosity. If the level of $B_2O_3$ becomes too high, the chemical resistance drops and there is an increased risk of segregation.

Furthermore, according to the invention the ratio between $SiO_2$ and $ZrO_2+La_2O_3+Nb_2O_5+Ta_2O_5$ is 1.5–2.3. The ratio selected sets the $n_d$-$v_d$ range to the claimed range while at the same time achieving a low partial dispersion. Moreover, the crystallization and melting properties are in this way kept within acceptable limits.

To improve the glass and bubble quality, one or more refining agents which are known per se ($SnO_2$, $Sb_2O_3$) may be added to the batch in the usual quantities for refining purposes. As a result, the glasses have a particularly good internal glass quality with regard to absence of bubbles and cords. Depending on the application and melting temperature, sulfates and chlorides can also be used as refining agents.

However, the glasses according to the invention can also be produced in an acceptable glass quality without the use of refining agents. However, a preferred embodiment of the invention provides for up to 2% by weight of $SnO_2$ or $Sb_2O_3$ to be added as refining agents.

The glasses can be melted using conventional melting methods. However, on account of the high concentrations of $ZrO_2$ and $Nb_2O_5$ and/or $Ta_2O_5$, Pt—Rh alloys are required as crucible material. However, these alloys may lead to a brownish-yellow discoloration, which is often unacceptable for optical glasses.

Melting in standard refractory materials, apart from pure $SiO_2$, is likewise not recommended on account of discoloration and possibly also the formation of cords and nodes. On the other hand, pure $SiO_2$ dissolves very quickly at the high temperatures required, making production uneconomic. In this case too, there is a risk of cords being formed. In certain cases, therefore, production in a fused silica tank may be possible, but this also entails the drawbacks described above.

It is preferable for the glass according to the invention to be melted by means of high-frequency technology in what is known as a skull crucible. A method of this type is described, for example, in documents DE 199 39 779, DE 101 48 754.1, DE 199 39 772 and DE 100 02 019, the content of disclosure of which is hereby incorporated in its entirety in the present invention.

The invention is explained in more detail below with reference to the embodiments:

The embodiments were melted in the following way:

Conventional melting

The glasses according to the invention were produced in the following way: the oxides or raw materials for the oxides, preferably carbonates and/or nitrates were weighed out according to the required composition and were thoroughly mixed. The batch was melted, refined and homogenized at between 1580° C. and 1680° C. in a discontinuous appliance. To prevent crystallization, casting was also carried out at between 1580° C. and 1680° C.

2. High-frequency Melting

The batch is produced as described above. The batch is introduced into the skull crucible and premelted by means of a burner until a partially melted volume of good electrical conductivity is formed. Then, the high-frequency heating is switched on and the batch is completely melted. The burner can now be switched off. The process which follows can then take place in continuous or discontinuous mode. During melting, temperatures of up to 1800° C. are set, and during refining temperatures of up to 1900° C. are set. In principle, higher temperatures are possible. Casting takes place with a suitable viscosity and above the liquids temperature (upper devitrification point: crystallization).

Embodiments 1–12, 16, 18 and 19 were melted by means of the conventional method, and embodiments 13–15 and 17 were melted by means of the high-frequency method.

Embodiment No. 20 is a comparison glass based on borate having the following composition (in % by weight):

| | |
|---|---|
| $SiO_2$ | 9.90% |
| $B_2O_3$ | 38.77% |
| $Al_2O_3$ | 12.23% |
| $ZrO_2$ | 1.00% |
| $La_2O_3$ | 2.30% |
| ZnO | 0.60% |
| PbO | 33.80% |
| $K_2O$ | 1.10% |
| $As_2O_3$ | 0.15% |

The comparison was produced without discoloration in the Pt crucible.

The compositions (in % by weight, based on oxide) and main properties of the embodiments are listed in Table 1 (on pages) and Table 2 (on pages). These properties are the coefficient of thermal expansion α in ppm/K, the transformation temperature Tg in 20/300° C. and the density in g/cm³. The optical data refractive index $n_d$ at 587 nm, Abbe number $v_d$ at 587 nm, the relative partial dispersion $P_{gF}$ between the wavelengths 435 nm and 486 nm, the deviation of the relative partial dispersion from the normal line defined in accordance with the Schott Glas catalog $\Delta P_{gF}$, the relative partial dispersion $P_{Cs}$ between the wavelengths 656 nm and 852 nm, the deviation in the relative partial dispersion from the normal line $\Delta P_{Cs}$ are also given.

TABLE 1

| | No. | | | | | | | | | |
|---|---|---|---|---|---|---|---|---|---|---|
| | 1 | 2 | 3 | 4 | 5 | 6 | 7 | 8 | 9 | 10 |
| $SiO_2$ | 55.0 | 55.0 | 55.0 | 55.0 | 55.0 | 51.0 | 51.0 | 52.0 | 51.0 | 55.0 |
| $Al_2O_3$ | 1.0 | 1.0 | 1.0 | 1.0 | 1.0 | 1.0 | 1.0 | 1.0 | 1.0 | 1.0 |
| $ZrO_2$ | 18.0 | 18.0 | 18.0 | 18.0 | 14.0 | 14.0 | 14.0 | 14.0 | 14.0 | 13.0 |
| MgO | 1.0 | 1.0 | 1.0 | 1.0 | 1.0 | 0.0 | 0.0 | 1.0 | 0.0 | 1.0 |
| CaO | 8.0 | 5.0 | 6.0 | 6.0 | 6.0 | 11.0 | 9.0 | 6.0 | 7.0 | 6.0 |
| BaO | 0.0 | 0.0 | 0.0 | 0.0 | 0.0 | 0.0 | 0.0 | 0.0 | 0.0 | 0.0 |
| $Na_2O$ | 3.0 | 3.0 | 3.0 | 3.0 | 3.0 | 8.0 | 10.0 | 3.0 | 8.0 | 3.0 |
| $K_2O$ | 5.0 | 5.0 | 5.0 | 5.0 | 5.0 | 0.0 | 0.0 | 5.0 | 0.0 | 5.0 |
| $Li_2O$ | 0.0 | 0.0 | 0.0 | 0.0 | 0.0 | 0.0 | 0.0 | 0.0 | 0.0 | 0.0 |
| $La_2O_3$ | 0.0 | 0.0 | 0.0 | 0.0 | 0.0 | 0.0 | 0.0 | 0.0 | 0.0 | 5.0 |
| $Nb_2O_5$ | 9.0 | 9.0 | 7.0 | 11.0 | 15.0 | 15.0 | 15.0 | 15.0 | 15.0 | 11.0 |
| $Ta_2O_5$ | 0.0 | 0.0 | 4.0 | 0.0 | 0.0 | 0.0 | 0.0 | 0.0 | 4.0 | 0.0 |
| $B_2O_3$ | 0.0 | 3.0 | 0.0 | 0.0 | 0.0 | 0.0 | 0.0 | 3.0 | 0.0 | 0.0 |
| Sum | 100.0 | 100.0 | 100.0 | 100.0 | 100.0 | 100.0 | 100.0 | 100.0 | 100.0 | 100.0 |
| Alpha | 5.97 | 5.49 | 5.68 | 5.71 | 5.76 | 6.9 | 7.24 | 6.19 | 6.3 | 6.03 |
| Tg | 754 | 702 | 766 | 753 | 730 | 726 | 716 | 687 | 735 | 738 |
| $n_d$ | 1.61360 | 1.60000 | 1.61031 | 1.61503 | 1.61775 | 1.64239 | 1.63728 | 1.62783 | 1.64108 | 1.61201 |
| $v_d$ | 46.45 | 46.61 | 46.47 | 45.04 | 43.36 | 43.00 | 42.92 | 43.56 | 41.60 | 45.97 |
| $P_{gF}$ | 0.5595 | 0.5595 | 0.5591 | 0.5620 | 0.5663 | 0.5660 | 0.5696 | 0.5659 | 0.5684 | 0.5613 |
| $\Delta P_{gF}$ | −0.0062 | −0.0059 | −0.0065 | −0.0060 | −0.0045 | −0.0054 | −0.0057 | −0.0046 | −0.0054 | −0.0052 |
| $P_{Cs}$ | 0.5170 | — | 0.5180 | — | 0.5100 | — | — | 0.5110 | 0.5070 | — |
| $\Delta P_{Cs}$ | 0.0060 | — | 0.0070 | — | 0.0060 | — | — | 0.0070 | 0.0070 | — |
| Density | — | — | — | — | — | — | — | — | — | — |

TABLE 2

|  | 11 | 12 | 13 | 14 | 15 | 16 | 17 | 18 | 19 | 20 (Comparative Example) |
|---|---|---|---|---|---|---|---|---|---|---|
| $SiO_2$ | 55.0 | 50.8 | 51.2 | 53.4 | 52.8 | 53.6 | 57.0 | 55.0 | 51.0 | |
| $Al_2O_3$ | 1.0 | 1.0 | 1.2 | 1.0 | 1.0 | 1.0 | 0.0 | 1.0 | 1.0 | |
| $ZrO_2$ | 15.0 | 10.2 | 12.7 | 13.0 | 11.1 | 14.8 | 18.0 | 15.0 | 14.0 | |
| MgO | 0.0 | 0.0 | 0.7 | 0.0 | 0.0 | 0.0 | 0.0 | 0.0 | 0.0 | |
| CaO | 6.0 | 11.0 | 4.6 | 4.0 | 4.0 | 4.0 | 2.0 | 0.0 | 11.0 | |
| BaO | 0.0 | 0.0 | 1.9 | 1.3 | 0.0 | 2.0 | 0.0 | 0.0 | 0.0 | |
| $Na_2O$ | 8.0 | 8.0 | 6.7 | 7.8 | 11.0 | 8.0 | 6.0 | 6.0 | 8.0 | |
| $K_2O$ | 0.0 | 0.0 | 3.7 | 5.0 | 5.0 | 5.0 | 0.0 | 0.0 | 0.0 | |
| $Li_2O$ | 0.0 | 0.0 | 2.0 | 0.4 | 0.0 | 0.0 | 2.0 | 2.0 | 0.0 | |
| $La_2O_3$ | 0.0 | 0.0 | 0.0 | 0.0 | 0.0 | 0.0 | 0.0 | 6.0 | 15.0 | |
| $Nb_2O_5$ | 9.0 | 15.0 | 8.9 | 8.1 | 9.0 | 7.6 | 9.0 | 9.0 | 0.0 | |
| $Ta_2O_5$ | 6.0 | 4.0 | 6.0 | 6.0 | 6.0 | 4.0 | 6.0 | 6.0 | 0.0 | |
| $B_2O_3$ | 0.0 | 0.0 | 0.3 | 0.0 | 0.0 | 0.0 | 0.0 | 0.0 | 0.0 | |
| Sum | 100.0 | 100.0 | 100.0 | 100.0 | 100.0 | 100.0 | 100.0 | 100.0 | 100.0 | |
| Alpha | 5.96 | 6.93 | 7.73 | 7.4 | 8.3 | 7.26 | 5.79 | 5.99 | 7.64 | 5.5 |
| Tg | 755 | 715 | 607 | 668 | 663 | 710 | 702 | 701 | 708 | 492 |
| $N_d$ | 1.61587 | 1.63771 | 1.62128 | 1.60615 | 1.60070 | 1.60461 | 1.61963 | 1.62031 | 1.62193 | 1.6134 |
| $v_d$ | 44.8 | 42.9 | 45.5 | 46.2 | 45.9 | 46.5 | 44.2 | 44.3 | 51.1 | 44.29 |
| $P_{gF}$ | 0.5611 | 0.5664 | 0.5611 | 0.5598 | 0.5606 | 0.5595 | 0.5622 | 0.5623 | 0.5513 | 0.5607 |
| $\Delta PgFf$ | 0.0073 | 0.0051 | 0.0061 | 0.0063 | 0.0060 | 0.0061 | 0.0071 | 0.0070 | 0.0065 | 0.0087 |
| $P_{Cs}$ | 0.5150 | — | — | — | 0.5150 | — | 0.5160 | 0.5150 | 0.5230 | 0.5245 |
| $\Delta P_{Cs}$ | 0.0080 | — | — | — | 0.0050 | — | 0.0100 | 0.0090 | 0.0010 | 0.0184 |
| Density | — | — | 2.997 | 2.952 | 2.922 | 2.941 | 2.956 | 3.018 | 3.111 | 3.2 |

The chemical resistance of the glasses according to the invention is so good that it was no longer possible to measure any differences in the acid resistance ISO 8424, in the alkali resistance ISO/DIN 10629 and in the speck resistance (Schott-internal method for determining the speck resistance of optical glasses—stressing, observation and classification according to AAW FTA-3-5422) between the exemplary embodiments. The following statements are true of all the glasses according to the invention:

Acid resistance: Class 1, time required to remove 0.1 μm>100 h,

Alkali resistance: Class 1, time required to remove 0.1 μm>4 h,

Speck resistance: Class 0, pH: 4.6, abrasion layer <0.08 μm in 100 h

The measurement specimens were unchanged after the chemical esistance testing, unlike comparison optical glasses based on borate, e.g. embodiment No. 20, with an acid resistance of SR=52.3, AR=4.3 and FR=2, where specks, interference layers and opaque coatings were formed.

The chemical resistances described are standard measurements for optical glasses.

Finally, the glasses according to the invention have a high hardness compared to the abovementioned comparative example. Consequently, higher polishing machine abrasion rates can be employed by the end user, which leads to a considerable reduction in process costs.

We claim:

1. A lead-free and arsenic-free short flint glass with a refractive index $1.60 \leq n_d \leq 1.65$, an Abbe number of $41 \leq v_d \leq 52$, a relative partial dispersion $0.551 \leq P_{gF} \leq 0.570$ in the blue spectral region, a relative partial dispersion $0.507 \leq P_{Cs} \leq 0.525$ in the red spectral region, a negative deviation of the relative partial dispersion from the normal line $\Delta P_{g,F} \leq -0.0045$ which has the following composition (in % by weight):

| | |
|---|---|
| $SiO_2$ | >50–65 |
| $Al_2O_3$ | 0–7 |
| $B_2O_3$ | 0–6 |
| $Li_2O$ | 0–6 |
| $Na_2O$ | 3–11 |
| $K_2O$ | 0–6 |
| MgO | 0–12 |
| CaO | 1–12 |
| BaO | 0–8 |
| $La_2O_3$ | 0–15 |
| $Ta_2O_5$ | 0–10 |
| $Nb_2O_5$ | 4–20 |
| $ZrO_2$ | >10–20 |
| $\Sigma(CaO + MgO + BaO)$ | 1–25 |
| $\Sigma(Na_2O + K_2O + Li_2O)$ | 3–20 |
| $SiO_2/(ZrO_2 + La_2O_3 + Nb_2O_5 + Ta_2O_5)$ | 1.5–2.3. |

2. The lead-free and arsenic-free short flint glass as claimed in claim 1, which has the following composition (in % by weight):

| | |
|---|---|
| $SiO_2$ | >50–60 |
| $Al_2O_3$ | 0–5 |
| $B_2O_3$ | 0–3 |
| $Li_2O$ | 0–6 |
| $Na_2O$ | 4–11 |
| $K_2O$ | 0–6 |
| MgO | 0–8 |
| CaO | 1–8 |
| BaO | 0–8 |
| $La_2O_3$ | 0–15 |
| $Ta_2O_5$ | 0–10 |
| $Nb_2O_5$ | 6–20 |
| $ZrO_2$ | 14–20 |
| $\Sigma(CaO + MgO + BaO)$ | 1–24 |
| $\Sigma(Na_2O + K_2O + Li_2O)$ | 4–20 |
| $SiO_2/(ZrO_2 + La_2O_3 + Nb_2O_5 + Ta_2O_5)$ | 1.5–2.3. |

3. The lead-free and arsenic-free short flint glass as claimed in claim 1, which has the following composition (in % by weight):

| | |
|---|---|
| $SiO_2$ | >50–60 |
| $Al_2O_3$ | 0–3 |
| $Li_2O$ | 0–4 |
| $Na_2O$ | 5–11 |
| $K_2O$ | 0–6 |
| MgO | 0–8 |
| CaO | 1–8 |
| BaO | 0–8 |
| $La_2O_3$ | 0–15 |
| $Ta_2O_5$ | 2–10 |
| $Nb_2O_5$ | 6–20 |
| $ZrO_2$ | 14–20 |
| $\Sigma(CaO + MgO + BaO)$ | 1–24 |
| $\Sigma(Na_2O + K_2O + Li_2O)$ | 5–20 |
| $SiO_2/(ZrO_2 + La_2O_3 + Nb_2O_5 + Ta_2O_5)$ | 1.5–2.3. |

4. A lead-free and arsenic-free short flint glass which has the following composition (in % by weight):

| | |
|---|---|
| $SiO_2$ | >50–60 |
| $Al_2O_3$ | 0–3 |
| $Li_2O$ | 0–4 |
| $Na_2O$ | 5–11 |
| $K_2O$ | 0–6 |
| MgO | 0–8 |
| CaO | 1–8 |
| BaO | 0.2–8 |
| $La_2O_3$ | 0–15 |
| $Ta_2O_5$ | 2–10 |
| $Nb_2O_5$ | 6–20 |
| $ZrO_2$ | 14–20 |
| $\Sigma(CaO + MgO + BaO)$ | 1–24 |
| $\Sigma(Na_2O + K_2O + Li_2O)$ | 5–20 |
| $SiO_2/(ZrO_2 + La_2O_3 + Nb_2O_5 + Ta_2O_5)$ | 1.5–2.3. |

5. The lead-free and arsenic-free short flint glass as claimed in claim 1, which is produced in a cooled crucible using a high-frequency method.

6. The lead-free and arsenic-free short flint glass as claimed in claim 1, which includes standard quantities of refining agents, preferably up to 2% by weight of $SnO_2$ or $Sb_2O_3$.

* * * * *